United States Patent
Butzke

(10) Patent No.: US 6,386,610 B1
(45) Date of Patent: May 14, 2002

(54) MOVABLE SHELF DEVICE FOR A VAN

(76) Inventor: Alb D. Butzke, 9707 B Pine Pass Dr., Houston, TX (US) 77070

( * ) Notice: Subject to any disclaimer, the term of this patent is extended or adjusted under 35 U.S.C. 154(b) by 0 days.

(21) Appl. No.: 09/865,304

(22) Filed: May 25, 2001

(51) Int. Cl.⁷ ............................................. B60R 11/06
(52) U.S. Cl. ..................... 296/24.1; 296/37.1; 211/162; 224/543
(58) Field of Search .............................. 296/3, 19, 24.1, 296/37.1, 37.6, 37.8, 37.13; 211/94.01, 162, 126.15; 224/401, 543, 311

(56) References Cited

U.S. PATENT DOCUMENTS

| | | | |
|---|---|---|---|
| 2,098,828 A | * 11/1937 | Ludwick | ................ 211/162 X |
| 2,502,963 A | 4/1950 | Klee | |
| 3,741,450 A | 6/1973 | Seastrom | |
| 4,140,225 A | * 2/1979 | Hilgers et al. | ............... 211/162 |
| 4,889,377 A | * 12/1989 | Hughes | ...................... 296/3 X |
| 4,898,284 A | * 2/1990 | Arens | ......................... 211/162 |
| D312,604 S | 12/1990 | Barnes et al. | |
| 5,076,442 A | * 12/1991 | Hakeem | ...................... 211/162 |
| 5,106,141 A | 4/1992 | Mostashari | |
| 5,161,700 A | 11/1992 | Stannis | |
| 5,979,725 A | 11/1999 | Lehrman | |
| 6,189,945 B1 | * 2/2001 | Rockett | ....................... 211/169 |

* cited by examiner

Primary Examiner—Stephen T. Gordon
Assistant Examiner—Jason Morrow

(57) ABSTRACT

A movable shelf device for a van for positioning an easily accessible shelf unit in a van. The movable shelf device for a van includes a rail attached to a bottom surface of a top wall of a vehicle. A shelving unit has a bottom wall, a pair of lateral side walls, an upper wall, and a back wall, a plurality of panels extending between and attached to the lateral side walls. The panels each defining a shelf. A plurality of rods are attached to and extend upwardly from the upper wall of the shelving unit. Each of a plurality of pairs of wheels is rotatably coupled to one of the rods. Each of the pairs of wheels is positioned in the rail. The shelving unit may be moved along the rail away from and in front of a side door of a van.

6 Claims, 4 Drawing Sheets

MOVABLE SHELF DEVICE FOR A VAN

BACKGROUND OF THE INVENTION

1. Field of the Invention

The present invention relates to shelf devices and more particularly pertains to a new movable shelf device for a van for positioning an easily accessible shelf unit in a van.

2. Description of the Prior Art

The use of shelf devices is known in the prior art. More specifically, shelf devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 2,502,963; U.S. Pat. No. 5,979,725; U.S. Pat. No. 5,106,141; U.S. Pat. No. 3,741,450; U.S. Pat. No. 5,161,700; and U.S. Des. Pat. No. 312,604.

While these devices fulfill their respective, particular objectives and requirements, the aforementioned patents do not disclose a new movable shelf device for a van. The inventive device includes a rail attached to a bottom surface of a top wall of a vehicle. A shelving unit has a bottom wall, a pair of lateral side walls, an upper wall, and a back wall, a plurality of panels extending between and attached to the lateral side walls. Each of the panels is orientated generally parallel with the bottom wall and defines a shelf. A plurality of rods are attached to and extend upwardly from the upper wall of the shelving unit. Each of a plurality of pairs of wheels is rotatably coupled to one of the rods. Each of the pairs of wheels is positioned in the rail. The shelving unit may be moved along the rail away from and in front of a side door of a van.

In these respects, the movable shelf device for a van according to the present invention substantially departs from the conventional concepts and designs of the prior art, and in so doing provides an apparatus primarily developed for the purpose of positioning an easily accessible shelf unit in a van.

SUMMARY OF THE INVENTION

In view of the foregoing disadvantages inherent in the known types of shelf devices now present in the prior art, the present invention provides a new movable shelf device for a van construction wherein the same can be utilized for positioning an easily accessible shelf unit in a van.

The general purpose of the present invention, which will be described subsequently in greater detail, is to provide a new movable shelf device for a van apparatus and method which has many of the advantages of the shelf devices mentioned heretofore and many novel features that result in a new movable shelf device for a van which is not anticipated, rendered obvious, suggested, or even implied by any of the prior art shelf devices, either alone or in any combination thereof.

To attain this, the present invention generally comprises a rail attached to a bottom surface of a top wall of a vehicle. A shelving unit has a bottom wall, a pair of lateral side walls, an upper wall, and a back wall, a plurality of panels extending between and attached to the lateral side walls. Each of the panels is orientated generally parallel with the bottom wall and defines a shelf. A plurality of rods are attached to and extend upwardly from the upper wall of the shelving unit. Each of a plurality of pairs of wheels is rotatably coupled to one of the rods. Each of the pairs of wheels is positioned in the rail. The shelving unit may be moved along the rail away from and in front of a side door of a van.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new movable shelf device for a van apparatus and method which has many of the advantages of the shelf devices mentioned heretofore and many novel features that result in a new movable shelf device for a van which is not anticipated, rendered obvious, suggested, or even implied by any of the prior art shelf devices, either alone or in any combination thereof.

It is another object of the present invention to provide a new movable shelf device for a van which may be easily and efficiently manufactured and marketed.

It is a further object of the present invention to provide a new movable shelf device for a van which is of a durable and reliable construction.

An even further object of the present invention is to provide a new movable shelf device for a van which is susceptible of a low cost of manufacture with regard to both materials and labor, and which accordingly is then susceptible of low prices of sale to the consuming public, thereby making such movable shelf device for a van economically available to the buying public.

Still yet another object of the present invention is to provide a new movable shelf device for a van which provides in the apparatuses and methods of the prior art some of the advantages thereof, while simultaneously overcoming some of the disadvantages normally associated therewith.

Still another object of the present invention is to provide a new movable shelf device for a van for positioning an easily accessible shelf unit in a van.

Yet another object of the present invention is to provide a new movable shelf device for a van which includes a rail attached to a bottom surface of a top wall of a vehicle. A shelving unit has a bottom wall, a pair of lateral side walls, an upper wall, and a back wall, a plurality of panels extending between and attached to the lateral side walls. Each of the panels is orientated generally parallel with the bottom wall and defines a shelf. A plurality of rods are attached to and extend upwardly from the upper wall of the shelving unit. Each of a plurality of pairs of wheels is rotatably coupled to one of the rods. Each of the pairs of wheels is positioned in the rail. The shelving unit may be moved along the rail away from and in front of a side door of a van.

Still yet another object of the present invention is to provide a new movable shelf device for a van that may be retrofitted to existing vans.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
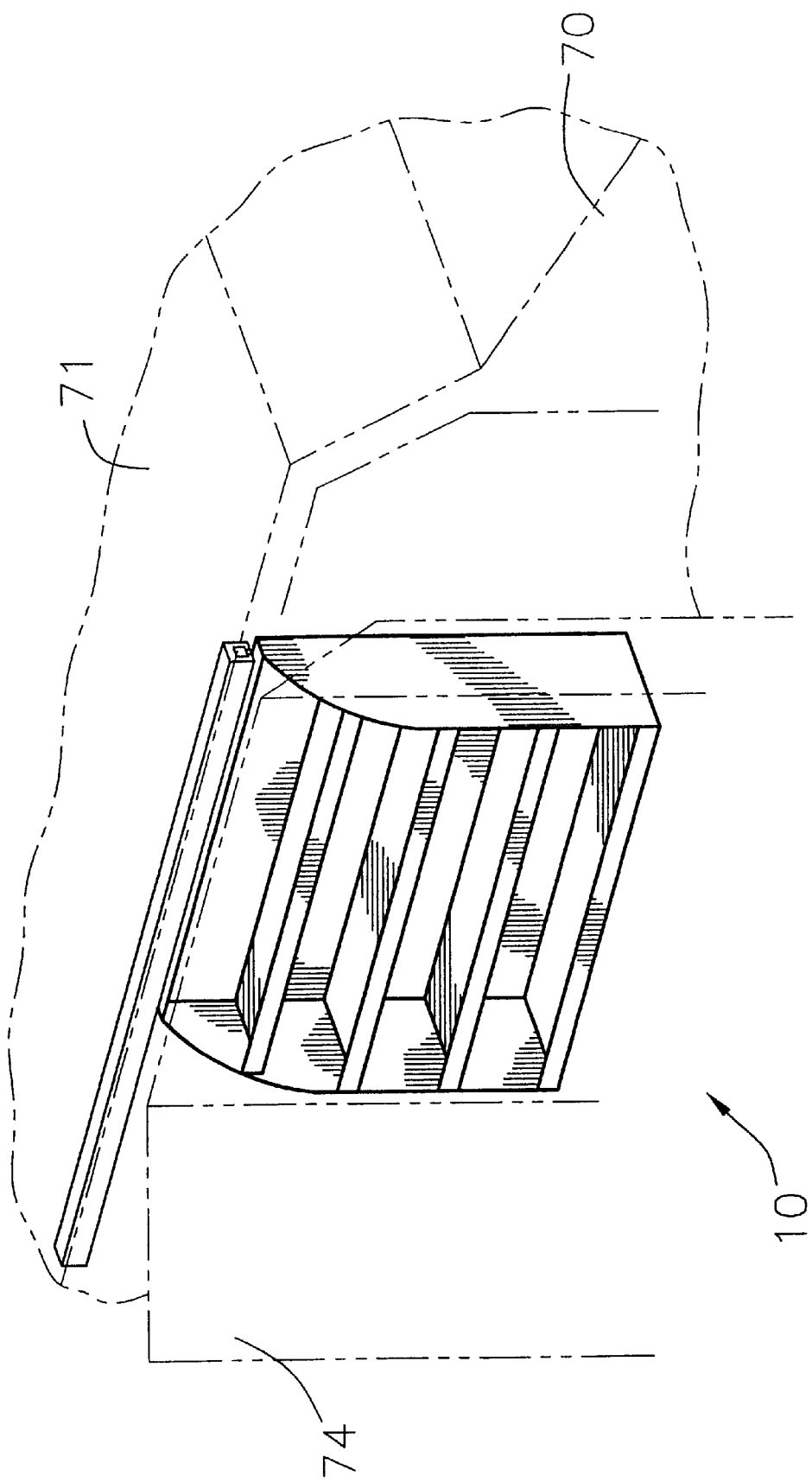
FIG. 1 is a schematic perspective view of a new movable shelf device for a van according to the present invention.
Figure 2:
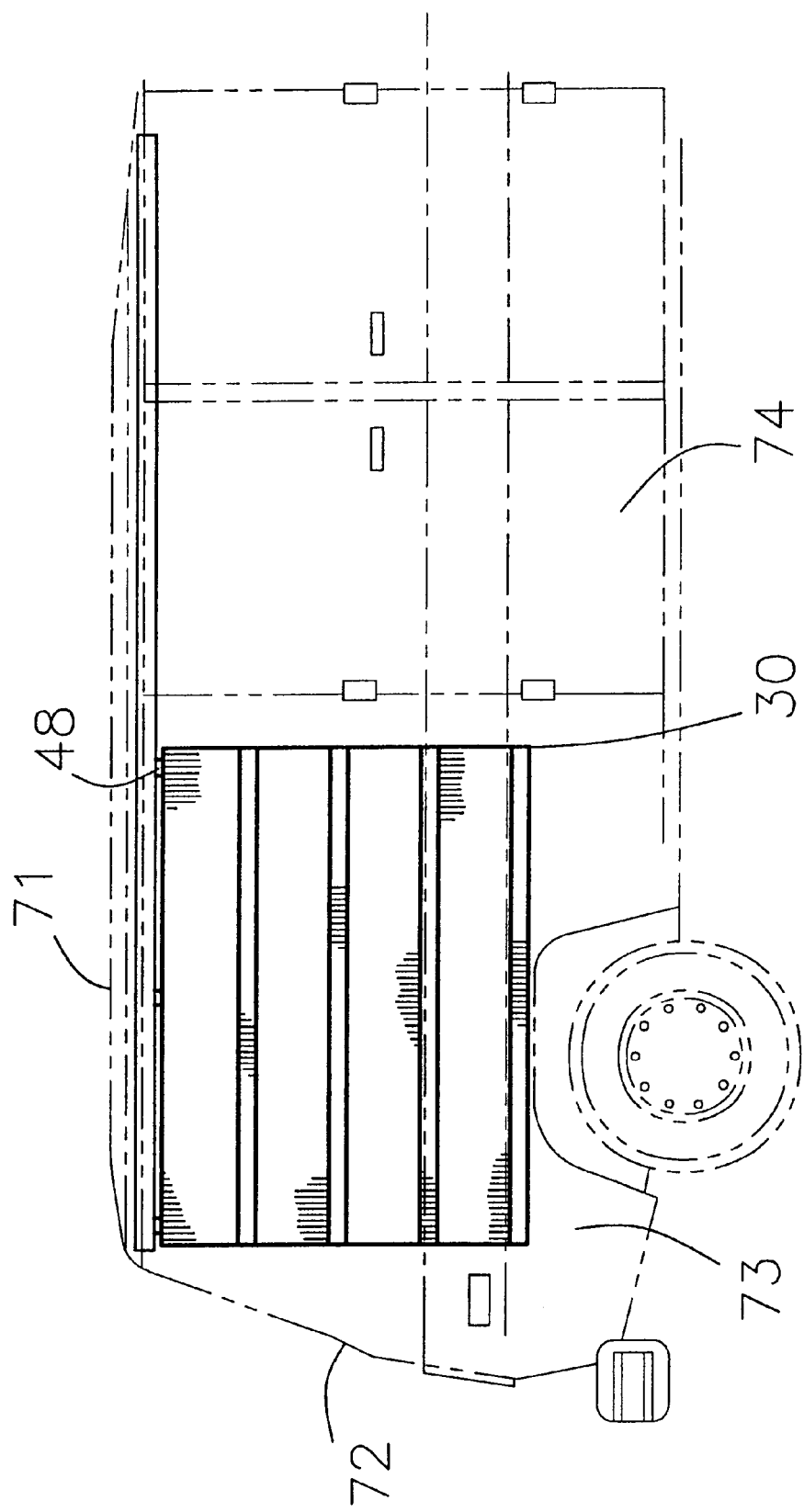
FIG. 2 is a schematic side view of the present invention.
Figure 3:
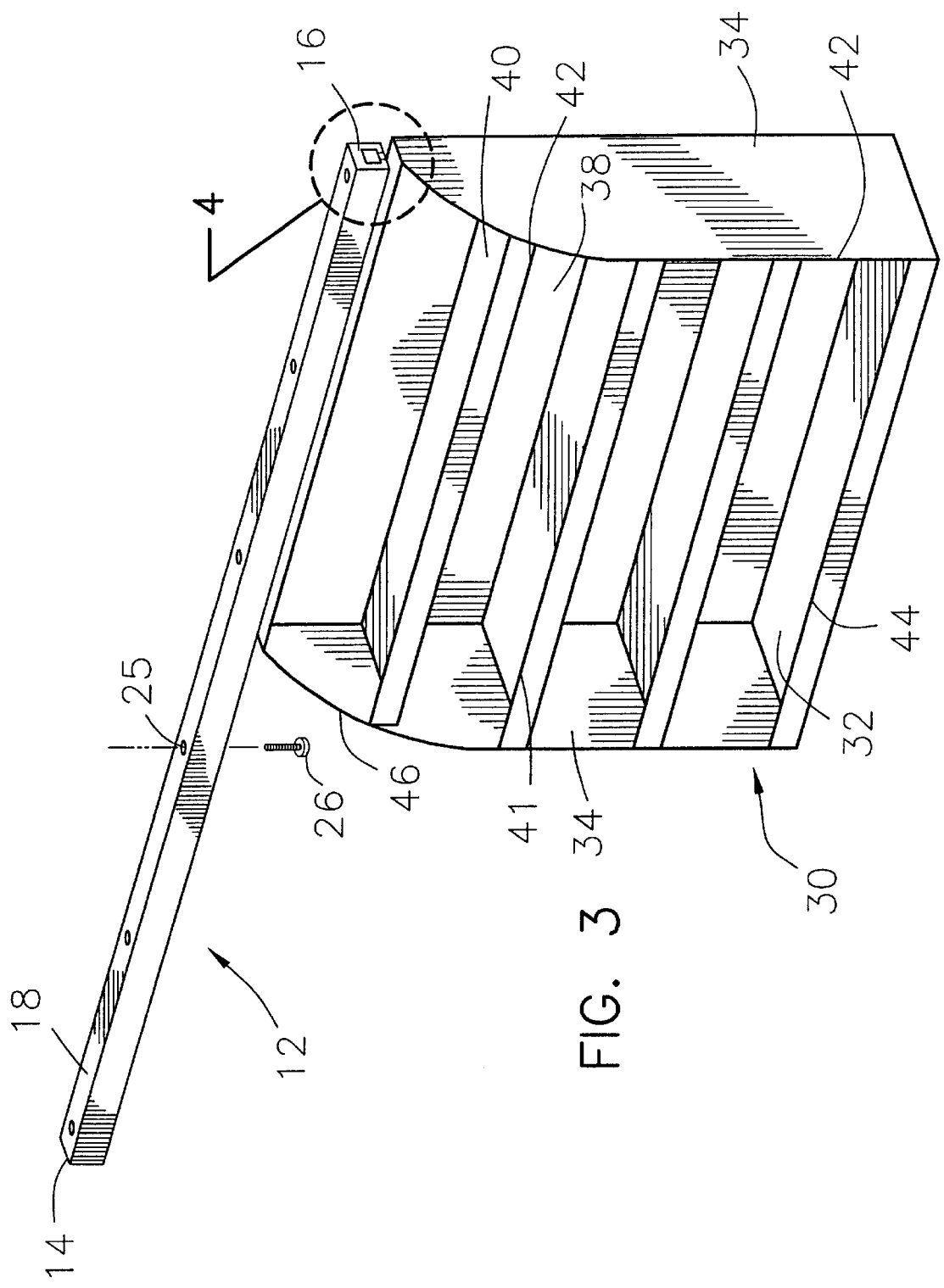
FIG. 3 is a schematic perspective view of the present invention.
Figure 4:
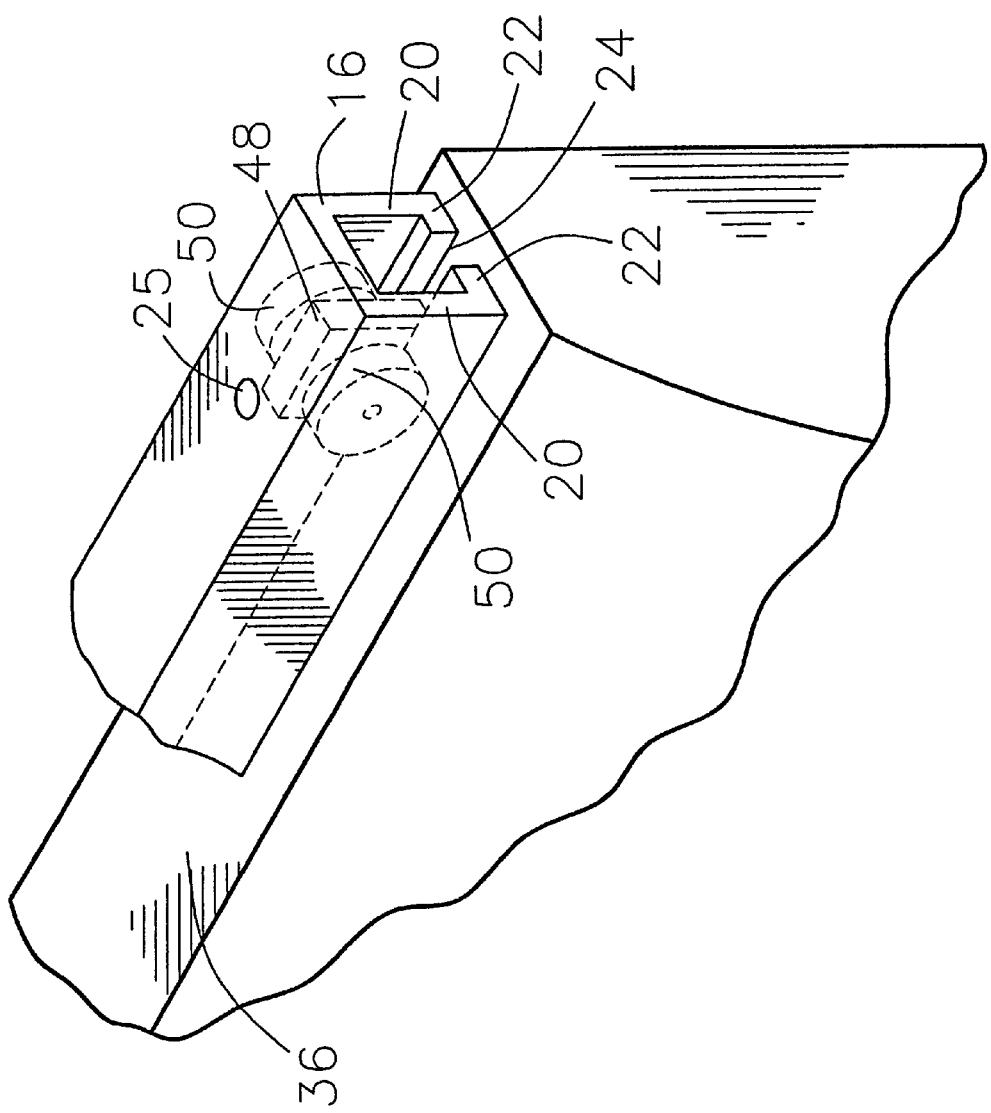
FIG. 4 is a schematic perspective view of the present invention.

With reference now to the drawings, and in particular to FIGS. 1 through 4 thereof, a new movable shelf device for a van embodying the principles and concepts of the present invention and generally designated by the reference numeral 10 will be described.

As best illustrated in FIGS. 1 through 4, the movable shelf device for a van 10 generally comprises a device for a van type vehicle 70 having a relatively large inner compartment including a top wall 71, a back wall 72 and a pair of side walls 73. At least one side door 74 is positioned in one of the side walls 73. The apparatus includes a rail 12 attached to a bottom surface of the top wall 71 of the vehicle 70. The rail 12 is elongated and has a first 14 end and a second end 16. The rail 12 includes a base section 18 and a pair of side sections 20 extending down from opposite edges of the base section 18 and along the length of the base section 18. Each of the side sections 20 has a flange 22 thereon. The flanges 22 extend toward each other such that a channel 24 is defined between the flanges 22. The base 18 has a plurality of apertures 25 therethrough. Conventional mechanical fasteners 26, such as screws or bolts, may be extended up through the apertures and into the top wall for fastening the rail 12 to the top wall 71, or the rail 12 may be attached using brackets, or welded to the top wall 71.

A shelving unit 30 has a bottom wall 32, a pair of lateral side walls 34, an upper wall 36, and a back wall 38. A plurality of panels 40 extend between and are attached to the lateral side walls 34. Each of the panels 40 is orientated generally parallel with the bottom wall 32 and defines a shelf. Each of the panels 40, bottom wall 32 and lateral side walls 34 has a front edge 42 positioned opposite of the back wall 38. Each of a plurality of lips 44 is coupled to and extends along a length of the front edges of the panels 40 and a front edge 42 of the bottom wall 32. Each of the lips 44 extends upwardly. An upper portion 46 of each of the front edges 42 of the lateral sides 34 is arced toward the back wall 38 such that the upper wall 36 has a width generally less than half a width of the bottom wall 32.

Each of a plurality of rods 48 is attached to and extends upwardly from the upper wall 36 of the shelving unit 30. Each of the rods 48 is spaced from each other and is located generally adjacent to the back wall 38.

Each of a plurality of pairs 50 of wheels is rotatably coupled to one of the rods 48. Each of the pairs of wheels 50 is positioned in the rail such that the rod 48 extends through the channel 24. The wheels 50 have a rotational axis orientated generally perpendicular to a longitudinal axis of the rail 12. Each of the wheels 50 of a pair of wheels is positioned on one of the flanges 22.

In use, the device 10 is used a conventional shelf for storing items. The shelving unit 30 may be moved along the rail away from and in front of the side door 74. This allows easy access to the shelf unit without having to get into the van 70 itself.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A shelving apparatus for a van type vehicle having a relatively large inner compartment including a top wall, a back wall and a pair of side walls, at least one side door being positioned in one of said side walls, said apparatus comprising:

a rail being attached to a bottom surface of said top wall of said vehicle;

a shelving unit having a bottom wall, a pair of lateral side walls, an upper wall, and a back wall, a plurality of panels extending between and being attached to said lateral side walls, each of said panels being orientated generally parallel with said bottom wall and defining a shelf;

a plurality of rods being attached to and extending upwardly from said upper wall of said shelving unit;

each of a plurality of pairs of wheels being rotatably coupled to one of said rods, each of said pairs of wheels being positioned in said rail; and wherein said shelving unit may be moved along said rail away from and in front of said side door.

2. The shelving apparatus as in claim 1, wherein said rail includes a base section and a pair of side sections extending down from opposite edges of said base section, each of said side sections having a flange thereon, said flanges extending toward each other such that a channel is defined between said flanges, said rod extending upwardly through said channel such that each of said wheels of a pair of wheels is positioned on one of said flanges.

3. The shelving apparatus as in claim 1, wherein each of said panels, bottom wall and lateral side walls have a front edge positioned opposite of said back wall, each of a plurality of lips being coupled to and extending along a length of said front edges of said panels and a front edge of said bottom wall, each of said lips extending upwardly.

4. The shelving apparatus as in claim 3, wherein an upper portion of each of said front edges of said lateral sides being arced toward said back wall such that said upper wall has a width generally less than half a width of said bottom wall.

5. A shelving apparatus for a van type vehicle having a relatively large inner compartment including a top wall, a back wall and a pair of side walls, at least one side door being positioned in one of said side walls, said apparatus comprising:

a rail being attached to a bottom surface of said top wall of said vehicle, said rail being elongated and having a first end and a second end, said rail including a base section and a pair of side sections extending down from opposite edges of said base section, each of said side sections having a flange thereon, said flanges extending toward each other such that a channel is defined between said flanges, said base having a plurality of apertures therethrough, wherein fasteners may be extended through said apertures for fastening said rail to said top wall;

a shelving unit having a bottom wall, a pair of lateral side walls, an upper wall, and a back wall, a plurality of panels extending between and being attached to said lateral side walls, each of said panels being orientated generally parallel with said bottom wall and defining a shelf, each of said panels, bottom wall and lateral side walls having a front edge positioned opposite of said back wall, each of a plurality of lips being coupled to and extending along a length of said front edges of said panels and a front edge of said bottom wall, each of said lips extending upwardly, an upper portion of each of said front edges of said lateral sides being arced toward said back wall such that said upper wall has a width generally less than half a width of said bottom wall;

a plurality of rods being attached to and extending upwardly from said upper wall of said shelving unit, each of said rods being spaced from each other and being located generally adjacent to said back wall;

each of a plurality of pairs of wheels being rotatably coupled to one of said rods, each of said pairs of wheels being positioned in said rail such that said rod extends through said channel, each of said wheels having a rotational axis orientated generally perpendicular to a longitudinal axis of said rail, each of said wheels of a pair of wheels being positioned on one of said flanges; and wherein said shelving unit may be moved along said rail away from and in front of said side door.

6. A shelving system comprising:

a van type vehicle having a relatively large inner compartment including a top wall, a back wall and a pair of side walls, at least one side door being positioned in one of said side walls:

a rail being attached to a bottom surface of said top wall of said vehicle, said rail being elongated and having a first end and a second end, said rail including a base section and a pair of side sections extending down from opposite edges of said base section, each of said side sections having a flange thereon, said flanges extending toward each other such that a channel is defined between said flanges, said base having a plurality of apertures therethrough, wherein fasteners may be extended through said apertures for fastening said rail to said top wall;

a shelving unit having a bottom wall, a pair of lateral side walls, an upper wall, and a back wall, a plurality of panels extending between and being attached to said lateral side walls, each of said panels being orientated generally parallel with said bottom wall and defining a shelf, each of said panels, bottom wall and lateral side walls having a front edge positioned opposite of said back wall, each of a plurality of lips being coupled to and extending along a length of said front edges of said panels and a front edge of said bottom wall, each of said lips extending upwardly, an upper portion of each of said front edges of said lateral sides being arced toward said back wall such that said upper wall has a width generally less than half a width of said bottom wall;

a plurality of rods being attached to and extending upwardly from said upper wall of said shelving unit, each of said rods being spaced from each other and being located generally adjacent to said back wall;

each of a plurality of pairs of wheels being rotatably coupled to one of said rods, each of said pairs of wheels being positioned in said rail such that said rod extends through said channel, each of said wheels having a rotational axis orientated generally perpendicular to a longitudinal axis of said rail, each of said wheels of a pair of wheels being positioned on one of said flanges; and wherein said shelving unit may be moved along said rail away from and in front of said side door.

\* \* \* \* \*